(12) United States Patent
Li et al.

(10) Patent No.: US 8,187,732 B2
(45) Date of Patent: May 29, 2012

(54) MEDIA LUBRICANT FOR HIGH TEMPERATURE APPLICATION

(75) Inventors: Lei Li, Wexford, PA (US); Xiaoping Yan, Wexford, PA (US); Paul M. Jones, St. John, VI (US); Jiping Yang, San Jose, CA (US); Yiao-Tee Hsia, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/618,592

(22) Filed: Nov. 13, 2009

(65) Prior Publication Data

US 2011/0117386 A1    May 19, 2011

(51) Int. Cl.
*G11B 5/66* (2006.01)

(52) U.S. Cl. ........... 428/835.7; 508/579; 508/590

(58) Field of Classification Search .......... None
See application file for complete search history.

(56) References Cited

U.S. PATENT DOCUMENTS

| 5,136,002 A * | 8/1992 | Sugimori et al. ............. 526/247 |
| 2003/0129455 A1 * | 7/2003 | Lee et al. ................. 428/694 TP |
| 2007/0060487 A1 | 3/2007 | Burns et al. |

OTHER PUBLICATIONS

Fomblin Z Derivative Product Data Sheet, Solvay Solexis, 2002.*

* cited by examiner

*Primary Examiner* — Holly Rickman
(74) *Attorney, Agent, or Firm* — Mueting Raasch & Gebhardt PA

(57) ABSTRACT

A lubricant layer for a magnetic recording medium may include a perfluoropolyether having monomer units and end groups selected to provide high thermal stability and good reliability.

21 Claims, 3 Drawing Sheets

MEDIA LUBRICANT FOR HIGH TEMPERATURE APPLICATION

BACKGROUND

Magnetic data storage devices include magnetic read/write heads, which detect and modify the magnetic properties of a magnetic storage medium. The magnetic storage medium may be coated with a lubricant layer, which reduces friction and wear caused by contact between a surface of the read/write head and the storage medium.

SUMMARY

In one aspect, the disclosure is directed to a magnetic recording medium comprising a substrate, a magnetic recording layer, and a lubricant layer. The lubricant layer includes a molecule having the formula:

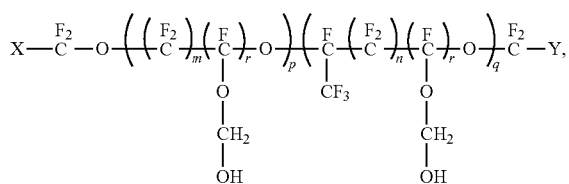

where X is set forth in Formulas 2-8 below; Y is set forth in Formulas 9-15 below; $m \geq 3$; $n \geq 1$; $r=0$ or 1; $0 \leq p \leq 200$; and $0 \leq q \leq 200$.

In another aspect, the disclosure is directed to a magnetic recording medium comprising a substrate, a magnetic recording layer, and a lubricant layer. The lubricant layer includes a molecule having the formula:

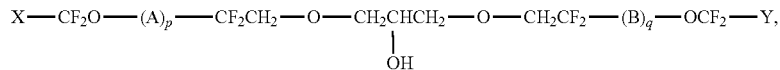

where X is set forth in Formulas 2-8 below; Y is set forth in Formulas 9-15 below; A is set forth in Formulas 18 and 19 below; B is set forth in Formulas 20 and 21 below; $0 \leq p \leq 200$; and $0 \leq q \leq 200$.

In another aspect, the disclosure is directed to a magnetic recording medium comprising a substrate, a magnetic recording layer, and a lubricant layer. The lubricant layer includes a molecule having the formula:

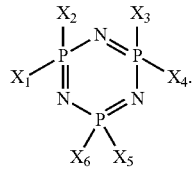

Each of $X_1$, $X_2$, $X_3$, $X_4$, $X_5$, and $X_6$ is independently selected from the group consisting of:

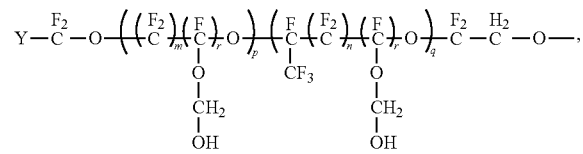

where Y is set forth in Formulas 9-15 below; $m \geq 3$; $n \geq 1$; $r=0$ or 1; $0 \leq p \leq 200$; and $0 \leq q \leq 200$;

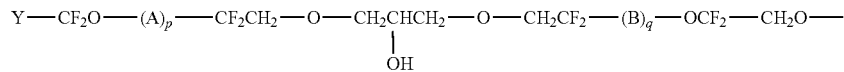

wherein Y is set forth in Formulas 9-15 below; A is set forth in Formulas 18 and 19 below; B is set forth in Formulas 20 and 21 below; $0 \leq p \leq 200$; and $0 \leq q \leq 200$; and

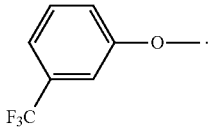

The details of one or more embodiments of the invention are set forth in the accompanying drawings and the description below. These and various other features and advantages will be apparent from a reading of the following detailed description.

DETAILED DESCRIPTION

The present disclosure is generally directed to perfluoropolyether lubricants having high thermal stability for use in a magnetic data storage device. Some new recording technologies require new media lubricants having higher thermal stability than other media lubricants. For example, in pseudo-contact recording, the read/write head and the magnetic medium are in continuous contact. This may cause an increase in the temperature of the magnetic medium and the lubricant. Another example is wire-assisted magnetic recording (WAMR), in which a wire is heated to assist with recording. The heated wire may lead to high temperatures in the lubricant, which may cause degradation if another lubricant is used. A third example is heat-assisted magnetic recording (HAMR), in which the magnetic medium is heated to a high temperature to assist with recording. HAMR may also lead to lubricant heating and degradation, if the other lubricant is used.

Some media lubricants are not thermally stable at the temperatures reached by these recording processes. More particularly, these media lubricants may evaporate or decompose at temperatures reached by these recording processes.

The lubricant disclosed herein is a perfluoropolyether that has thermal stability suitable for use at relatively high temperatures (e.g., up to or even greater than approximately 400° C.). The perfluoropolyether lubricant includes a polymer backbone selected to prevent decomposition at use temperatures of the lubricant. The polymer backbone of the perfluoropolyether lubricant also includes end groups that are selected to provide appropriate media-lubricant interactions to improve coating reliability (e.g., improve retention of the coating on the surface of the media). Additionally, the perfluoropolyether lubricant has a molecular weight that reduces or substantially prevents lubricant evaporation over the temperature range in which the lubricant is used.

Figure 1:
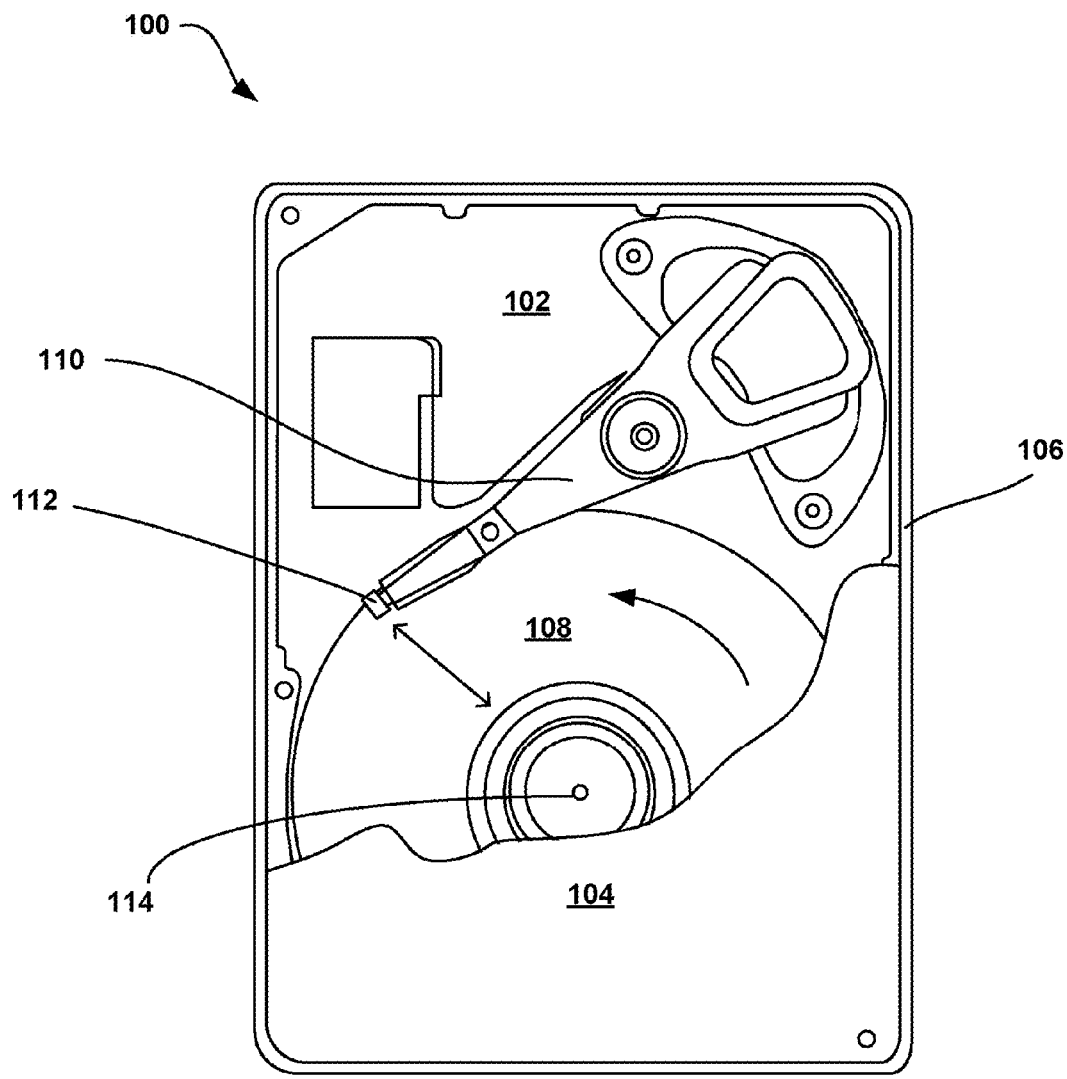
FIG. 1 is a schematic diagram of a hard disc drive.

FIG. 1 is a schematic diagram of an exemplary hard disc drive 100, which may utilize the perfluoropolyether lubricant of the present disclosure. Disc drive 100 includes base 102 and top cover 104, shown partially cut away. Base 102 combines with top cover 104 to form the housing 106 of disc drive 100. Disc drive 100 also includes one or more rotatable magnetic data discs 108. Data discs 108 are attached to spindle 114, which operates to rotate discs 108 about a central axis. Magnetic recording and read head 112 is adjacent to data discs 108. Actuator arm 110 carries magnetic recording and read head 112 for communication with each of data discs 108.

Surfaces of data discs 108 may be coated with a lubricant layer, which reduces friction and wear between a respective one of data discs 108 and a corresponding magnetic read/write head 112. The lubricant layer may include the perfluoropolyether lubricant described herein.

Figure 2:
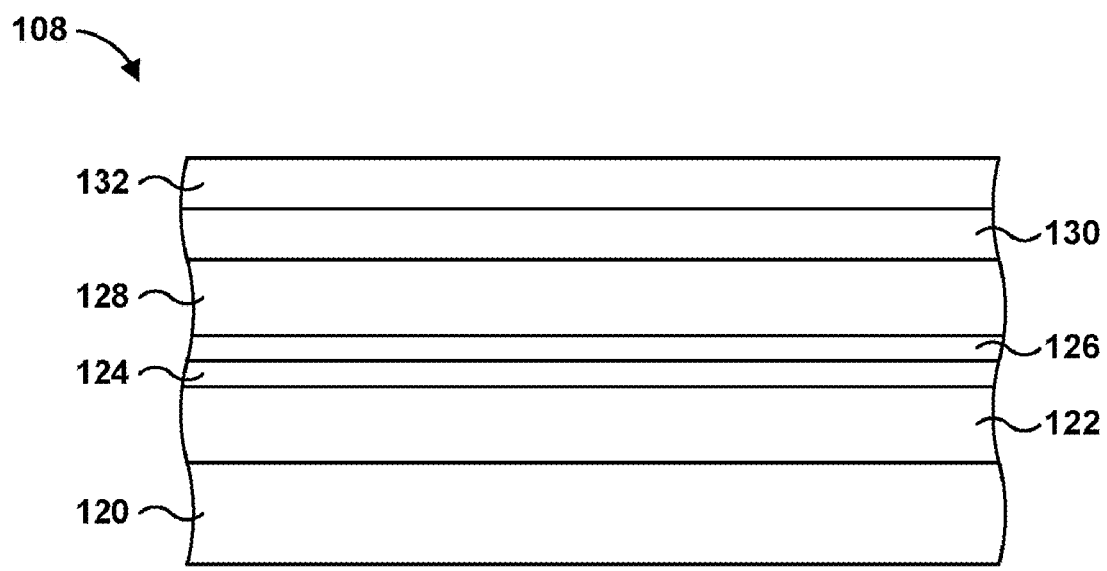
FIG. 2 is a simplified cross-sectional diagram of an example magnetic storage medium.

FIG. 2 illustrates a simplified cross-sectional diagram of an exemplary data disc 108. For purposes of illustration, data disc 108 is a perpendicular recording medium. However, in other examples, the perfluoropolyether lubricant disclosed herein may be utilized with another type of recording medium, such as, for example, a longitudinal recording medium, a HAMR recording medium, a WAMR recording medium, a magneto-optical recording medium, or the like. In the embodiment illustrated in FIG. 2, data disc 108 includes a substrate 120, a soft underlayer (SUL) 122, a first interlayer 124, a second interlayer 126, a magnetic recording layer 128, a media overcoat 130, and a lubricant layer 132.

Substrate 120 may include any material that is suitable to be used in magnetic recording media, including, for example, Al, NiP plated Al, glass, ceramic glass, or the like.

Although not shown in FIG. 2, in some embodiments, an additional underlayer may be present immediately on top of substrate 120. The additional underlayer may be amorphous and provides adhesion to the substrate and low surface roughness.

A soft underlayer (SUL) 122 is formed on substrate 120 (or the additional underlayer, if one is present). SUL 122 may be any soft magnetic material with sufficient saturation magnetization (Bs) and low anisotropy (Hk). For example, SUL 122 may be an amorphous soft magnetic material such as Ni; Co; Fe; an Fe-containing alloy such as NiFe (Permalloy), FeSiAl, FeSiAlN, or the like; a Co-containing alloy such as CoZr, CoZrCr, CoZrNb, or the like; or a CoFe-containing alloy such as CoFeZrNb, CoFe, FeCoB, FeCoC, or the like.

First interlayer 124 and second interlayer 126 may be used to establish an HCP (hexagonal close packed) crystalline orientation that induces HCP (0002) growth of the magnetic recording layer 128, with a magnetic easy axis perpendicular to the plane of data disc 108.

Magnetic recording layer 128 may be formed on second interlayer 126, and includes a plurality of magnetic grains having an easy axis of magnetic anisotropy oriented substantially perpendicular to the plane of data disc 108. Magnetic recording layer 128 may include Co alloys. For example, the Co alloy may include Co in combination with at least one of Cr, Ni, Pt, Ta, B, Nb, O, Ti, Si, Mo, Cu, Ag, Ge, or Fe. Magnetic recording layer 128 may also include a Fe—Pt alloy, a Sm—Co alloy, or the like. In some embodiments, magnetic recording layer 128 may include non-magnetic oxides, such as $SiO_2$, $TiO_2$, CoO, $Cr_2O_3$, $Ta_2O_5$, or the like, which separate the magnetic grains.

A media overcoat 130, which may include, for example, diamond like carbon, may be formed on magnetic recording layer 128. In other examples, media overcoat 130 may include an amorphous carbon layer that further includes hydrogen, nitrogen, or the like.

Lubricant layer 132 includes a perfluoropolyether lubricant. The perfluoropolyether lubricant may be selected to provide at least one of thermal stability, low evaporation, and bonding to media overcoat 130, in addition to reducing friction and/or wear between a surface of read/write head 112 and media overcoat 130.

While not to be bound by any theory, thermal stability of the perfluoropolyether lubricant may be influenced by the choice of backbone units in the polymer. For example, the backbone units of the lubricant molecule may be selected to be resistant to thermal oxidative and/or Lewis acid-catalyzed decomposition. In some embodiments, the backbone units of the lubricant molecule may be selected to provide thermal stability of the lubricant at temperatures greater than or equal to approximately 200° C. In some examples, the backbone units of the lubricant molecule may be selected to provide thermal stability of the lubricant at temperatures greater than approximately 400° C., such as, for example, up to approximately 410° C. In other examples, the backbone units of the lubricant molecule may be selected to provide thermal stability of the lubricant at temperatures up to approximately 450° C. Thermal stability of the perfluoropolyether lubricant may be defined as the temperature at which "take-off," or 1% weight loss, of the lubricant occurs when subjected to thermogravimetric analysis (TGA) in air with a 10° C./min temperature ramp rate. Thus, in some examples, the perfluoropolyether lubricant may have a take-off temperature of greater than approximately 400° C., up to approximately 410° C., or up to approximately 450° C.

Low evaporation of the perfluoropolyether lubricant at use temperatures may be affected by the molecular weight of the perfluoropolyether molecule. The molecular weight of the perfluoropolyether molecule is preferably between approximately 2,000 g/mol and approximately 40,000 g/mol. In some embodiments, the molecular weight of the perfluoropolyether molecule may be between approximately 6,000 g/mol and approximately 12,000 g/mol.

The end groups of the perfluoropolyether lubricant molecules may be selected to provide appropriate bonding between the lubricant molecule and media overcoat 130. This may promote reliability of lubricant layer 132 by retaining lubricant layer 132 on media overcoat 130.

Lubricant layer 132 may be deposited on media overcoat 130 to a thickness of between about 0.5 nm and about 2 nm. In some preferred embodiments, lubricant layer 132 may have a thickness between about 1 nm and about 1.5 nm.

In one embodiment lubricant layer 132 includes a perfluoropolyether lubricant molecule having a chemical structure of the form shown in Formula 1:

Formula 1

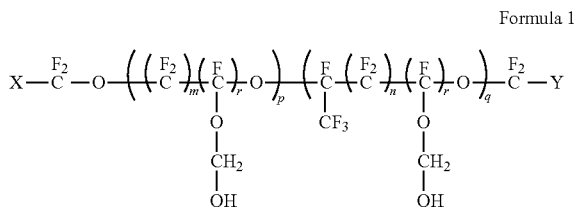

where $m \geq 3$; $n \geq 1$; $r=0$ or 1; $0 \leq p \leq 200$; and $0 \leq q \leq 200$. In one embodiment, $m=3$, $r=0$, $q=0$, and $12 \leq p \leq 200$. The end group X may be selected from among the structures shown in Formulas 2-8 below.

Formula 2

Formula 3

Formula 4

Formula 5

Formula 6

Formula 7

Formula 8

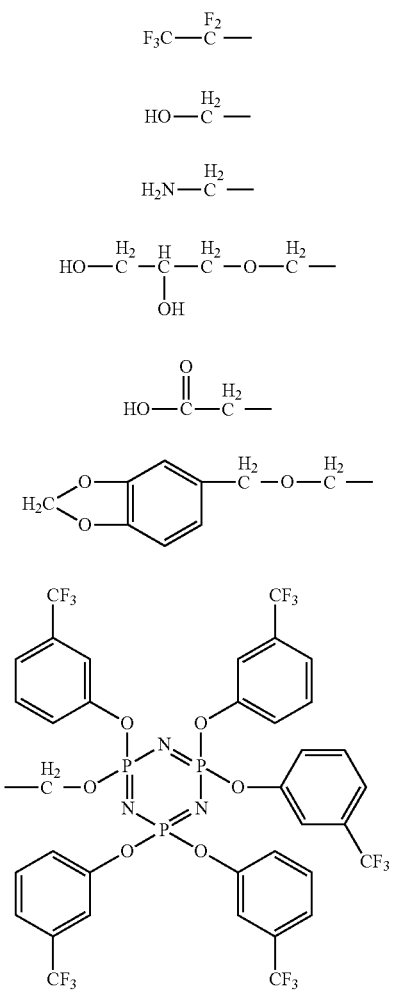

Similarly, the end group Y may be selected from among Formulas 9-15, shown below:

Formula 9

Formula 10

Formula 11

Formula 12

Formula 13

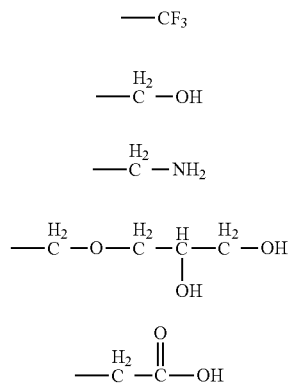

Formula 14

Formula 15

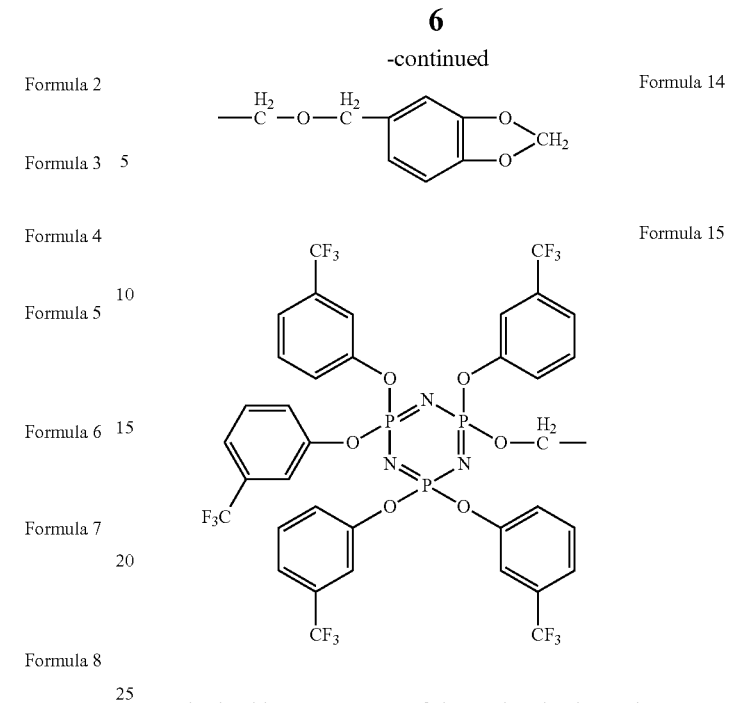

The backbone structure of the molecule shown in FIG. 1 includes [$(CF_2)_m$—O] monomeric units and/or [$CF(CF_3)(CF_2)_n$—O] monomeric units, which may mitigate or substantially prevent thermal oxidative decomposition and/or Lewis acid-catalyzed decomposition.

Additionally, to mitigate or substantially prevent the lubricant molecules from evaporation at low temperatures, such as temperatures at or below about 200° C., the molecular weight of the molecule represented by Formula 1 may range from about 2,000 g/mol to about 40,000 g/mol. In some embodiments, the molecular weight of the perfluoropolyether molecule may be between approximately 6,000 g/mol and approximately 12,000 g/mol.

In some embodiments, as shown in Formula 1, a monomeric unit shown below in Formula 16 may be included in the backbone. This unit may result in the polymer chain taking a flatter conformation along the surface of media overcoat 130 due to bonding between the —OH group in the unit shown in Formula 16 and media overcoat 130. In some embodiments, this may result in a thinner lubricant layer 132 compared to a lubricant layer that does not include a unit shown in Formula 16.

Formula 16

In other embodiments, lubricant layer 132 includes a molecule having a chemical structure shown in Formula 17:

Formula 17

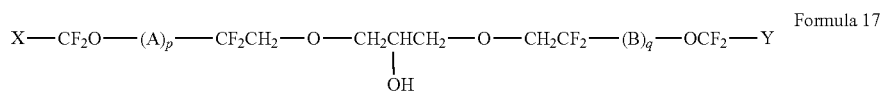

wherein $0 \leq p \leq 200$ and $0 \leq q \leq 200$. The A groups may be selected from the units shown in Formulas 18 and 19.

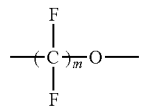

Formula 18

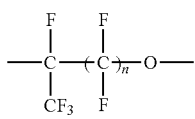

Formula 19 where $m \geq 3$ and $n \geq 1$.

Similarly, the B groups may be selected from the structures shown in Formulas 20 and 21.

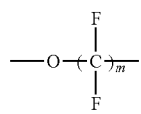

Formula 20

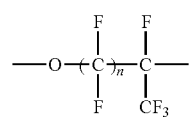

Formula 21 where $m \geq 3$ and $n \geq 1$.

The X end group may be selected from those groups shown in Formulas 2-8, and the Y end group may be selected those groups shown in Formulas 9-15. The X group and Y group may be the same or different. Each of the X group and Y group may affect interaction between media overcoat 130 and lubricant layer 132, and may influence reliability of lubricant layer 132 (e.g., retention of lubricant layer 132 on the surface of media overcoat 130).

The molecule shown in Formula 17 includes a $[(CF_2)_m$—$O]$ unit, a $[CF(CF_3)(CF_2)_n$—$O]$ unit, or both. As described above, either of these units may mitigate or substantially prevent thermal oxidative decomposition and/or Lewis acid-catalyzed decomposition of the perfluoropolyether lubricant molecule.

Additionally, the molecule shown in Formula 17 includes a —$CF_2CH_2OCH_2CH(OH)CH_2OCH_2CF_2$— linkage in the backbone of the perfluoropolyether molecule. This linkage may facilitate a flatter conformation of the perfluoropolyether molecule due to bonding of the hydroxyl (OH) group and a surface of media overcoat 130. In some embodiments, this may result in a thinner lubricant layer 132 compared to a lubricant layer 132 that does not include a —$CF_2CH_2OCH_2CH(OH)CH_2OCH_2CF_2$— linkage.

To mitigate or substantially prevent the lubricant molecules from evaporation at low temperatures, such as temperatures at or below about 200° C., the molecular weight of the molecule represented in Formula 17 may range from about 2,000 g/mol to about 40,000 g/mol. In some embodiments, the molecular weight of the perfluoropolyether molecule may be between approximately 6,000 g/mol and approximately 12,000 g/mol.

In a further embodiment, lubricant layer 132 includes a molecule having a chemical structure shown below in Formula 22:

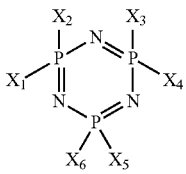

Formula 22

Each of the groups $X_1$, $X_2$, $X_3$, $X_4$, $X_5$, and $X_6$ may be independently selected from the groups shown below in Formulas 23-25.

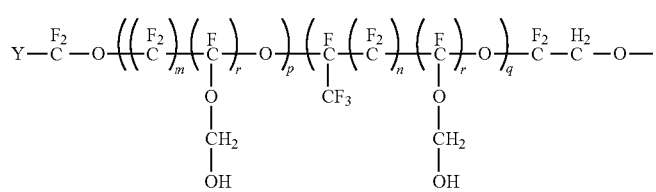

Formula 23

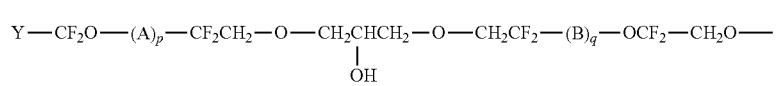

Formula 24

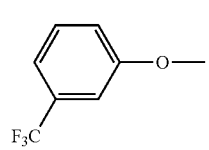

Formula 25

In the group shown in Formula 23, $m \geq 3$; $n \geq 1$; $r=0$ or 1; $0 \leq p \leq 200$; and $0 \leq q \leq 200$. The Y group may be selected from among the groups shown in Formulas 9-15 above.

In the group shown in Formula 24, $0 \leq p \leq 200$ and $0 \leq q \leq 200$. The A group may be selected from Formulas 18 and 19, and the B group may be selected from Formulas 20 and 21.

The molecule shown in Formula 22 is nonlinear and includes six chains extending from the central cyclotriphosphazene ring. Cyclotriphosphazene is a strong Lewis base and may provide thermal stability to the lubricant molecule at high temperatures and in contact with Lewis acids (e.g., may provide resistance to Lewis acid catalyzed degradation).

Cyclotriphosphazene may also result in a more planar structure for the lubricant molecule, which may result in a thinner lubricant layer 132 compared to a lubricant layer 132 that does not include molecules having a cyclotriphosphazene ring.

To mitigate or substantially prevent the lubricant molecules from evaporation at low temperatures, such as temperatures at or below about 200° C., the molecular weight of the molecule represented in Formula 22 may range from about 2,000 g/mol to about 40,000 g/mol. In some embodiments, the molecular weight of the perfluoropolyether molecule may be between approximately 6,000 g/mol and approximately 12,000 g/mol.

In some embodiments, lubricant layer 132 may be deposited on media overcoat 130 using dip coating. The thickness of lubricant layer 132 may be controlled by controlling the concentration of the lubricant molecules in the dip coating solution and/or by controlling the pullout speed of the data disc 108 from the coating solution. In one example, the concentration of the lubricant molecules in the dip coating solution is between approximately 0.2 g/L and approximately 2 g/L and the pull-out speed of the data disc 108 from the coating solution is between approximately 0.5 mm/s and approximately 5 mm/s. The solvent may include fluorinated materials, such as, for example, those available under the trade designation Vertrel® XF from DuPont, Wilmington, Del., or those available under the trade designation 3M™ Novec™ Engineered Fluids from 3M Company, St. Paul, Minn.

In other embodiments, lubricant layer 132 may be applied by another coating technique, such as, for example, vapor lube, electrostatic spraying, or the like. Other coating technologies useful for depositing lubricant layer 132 will be apparent to those of skill in the art, and are within the scope of the disclosure.

Once lubricant layer 132 has been deposited on media overcoat 130, lubricant layer 132 may be exposed to a treatment to tailor the performance of the lubricant layer 132. For example, lubricant layer 132 may be exposed to a thermal treatment, electron beam treatment, gamma radiation treatment, ultraviolet (UV) radiation treatment, infrared (IR) radiation treatment, or the like.

EXAMPLES

Example 1

High molecular weight poly(perfluorotrimethylene oxide) (Nye Lubricants Inc., Fairhaven, Mass.) with perfluorinated end groups was utilized as an example of the perfluoropolyether of the present disclosure. The structure of poly(perfluorotrimethylene oxide) is shown in Formula 26:

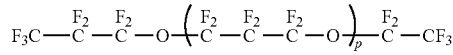

Formula 26

The poly(perfluorotrimethylene oxide) had an number average molecular weight ($M_n$) of 10,000 g/mol and a polydispersity index (PDI) of less than 1.1.

Figure 3:
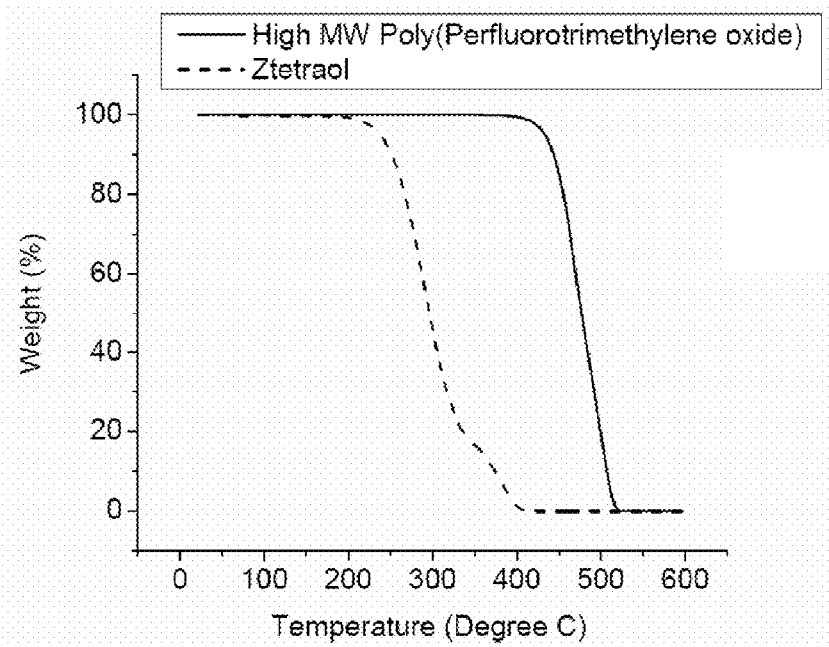
FIG. 3 is a diagram showing ramp-mode thermogravimetric analysis results of poly(perfluorotrimethylene oxide) and z-tetraol.

The poly(perfluorotrimethylene oxide) underwent thermogravimetric analysis (TGA) using a TA Instrument TGA 2950 (TA Instruments, New Castle, Del.) using a platinum sample pan. In a first test, 10 mg of poly(perfluorotrimethylene oxide) was heated in ramp mode at a rate of 10° C./min from room temperature to 600° C. The remaining weight of poly (perfluorotrimethylene oxide) was recorded as a percentage of the original mass. As shown in FIG. 3, the take-off (1% weight loss) temperature of poly(perfluorotrimethylene oxide) was approximately 410° C.

Comparative Example 1

Z-tetraol (Solvay Solexis, Inc., Bollate, Italy) also underwent TGA using the TA Instrument TGA 2950 using a platinum sample pan. The structure of z-tetraol is shown below in Formula 27:

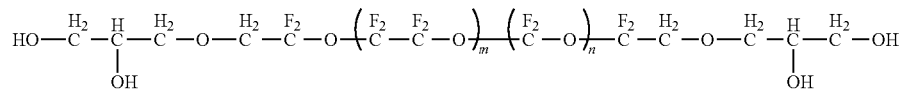

Formula 27

In a first test, 10 mg of z-tetraol was heated in ramp mode at a rate of 10° C./min from room temperature to 600° C. The remaining weight of z-tetraol was recorded as a percentage of the original mass. As shown in FIG. 3, the take-off (1% weight loss) temperature of z-tetraol was approximately 200° C., much lower than the take-off temperature of poly(perfluorotrimethylene oxide), which was approximately 410° C.

Examples 2-4

Figure 4:
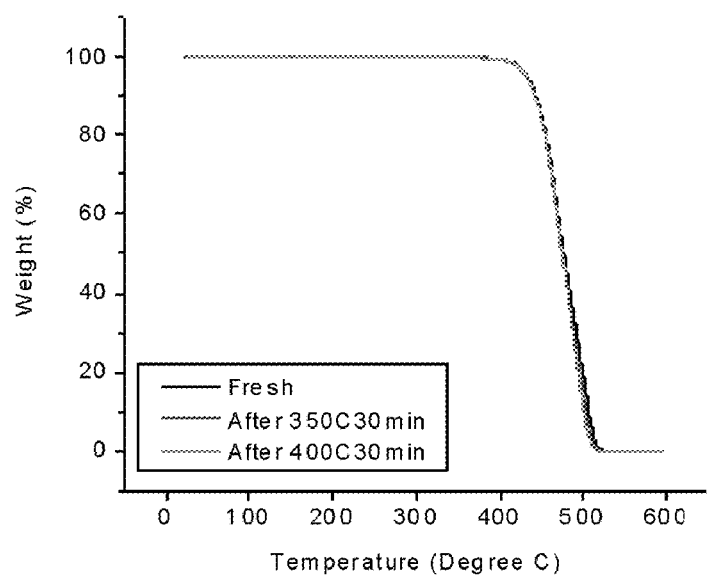
FIG. 4 is a diagram showing ramp-mode thermogravimetric analysis results of three samples of poly(perfluorotrimethylene oxide).

Two samples of the poly(perfluorotrimethylene oxide) having experienced 30 minutes preheating at 350° C. and 30 minutes preheating at 400° C., respectively, were compared to a sample of poly(perfluorotrimethylene oxide) that had not experienced prior heating. The samples were heated (after preheating for those samples that were preheated) at a ramp rate of 10° C./min to a temperature of 600° C. in a TGA 2950 (TA Instruments, New Castle, Del.). The remaining weight of the samples was recorded as a function of temperature. The results are shown in FIG. 4. The TGA curve for each of the samples is substantially similar, indicating heating of the sample does not significantly change the lubricant.

Various embodiments of the invention have been described. The implementations described above and other implementations are within the scope of the following claims.

The invention claimed is:

1. A magnetic recording medium comprising:
   a substrate;
   a magnetic recording layer; and
   a lubricant layer, wherein the lubricant layer comprises a molecule having the formula:

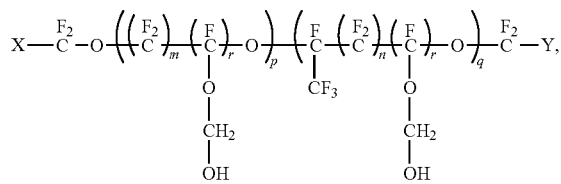

and
   wherein $m \geq 3$; $n \geq 1$; $r=1$; $12 \leq p \leq 200$; $0 \leq q \leq 200$; and X and Y are end groups.

2. The magnetic recording medium of claim 1, wherein X is selected from the group consisting of

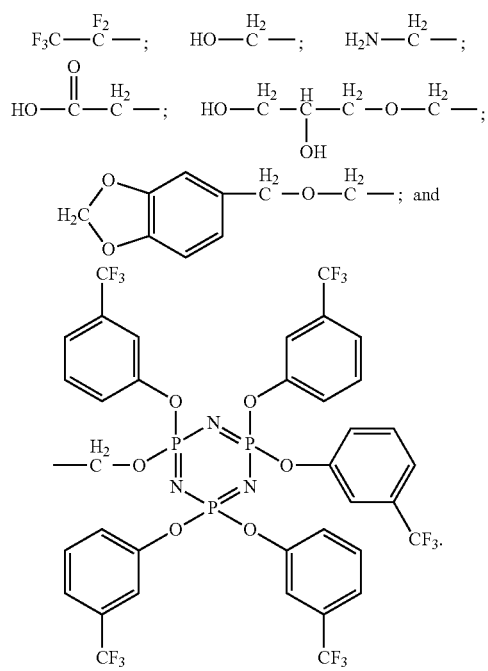

3. The magnetic recording medium of claim 1, wherein Y is selected from the group consisting of

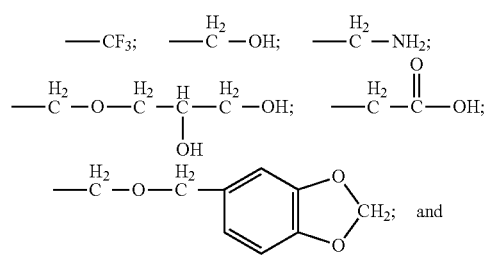

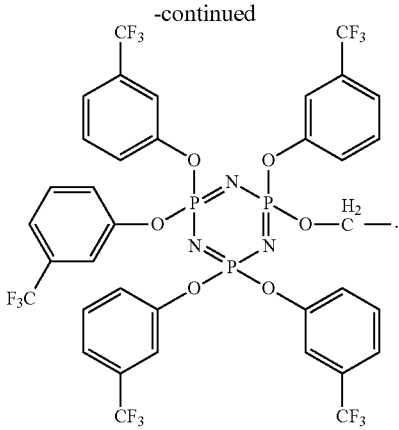

4. The magnetic recording medium of claim 1, wherein the molecule has a molecular weight between approximately 2,000 g/mol and approximately 40,000 g/mol.

5. The magnetic recording medium of claim 1, wherein the lubricant layer comprises a thickness between approximately 0.5 nm and approximately 2 nm.

6. The magnetic recording medium of claim 5, wherein the lubricant layer comprises a thickness between approximately 1 nm and approximately 1.5 nm.

7. The magnetic recording medium of claim 1, wherein the molecule has a take-off temperature of greater than approximately 400° C.

8. A method comprising:
   depositing a lubricant layer on a surface of a magnetic recording medium, wherein the lubricant layer comprises a molecule having the formula:

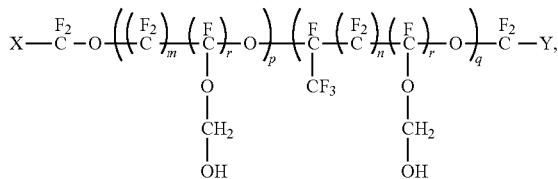

and
   wherein $m \geq 3$; $n \geq 1$; $r=1$; $12 \leq p \leq 200$; $0 \leq q \leq 200$; and X and Y are end groups.

9. The method of claim 8, wherein depositing the lubricant layer comprises at least one of dip-coating, depositing by vapor lube, electrostatic spraying the lubricant layer on the surface of the magnetic recording medium.

10. The method of claim 8, further comprising:
    applying a treatment to the lubricant layer, wherein the treatment comprises at least one of a thermal treatment, an electron beam treatment, a gamma radiation treatment, a UV radiation treatment or an IR radiation treatment.

11. The method of claim 8, wherein X is selected from the group consisting of

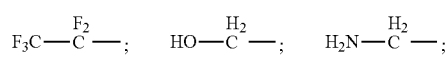

-continued

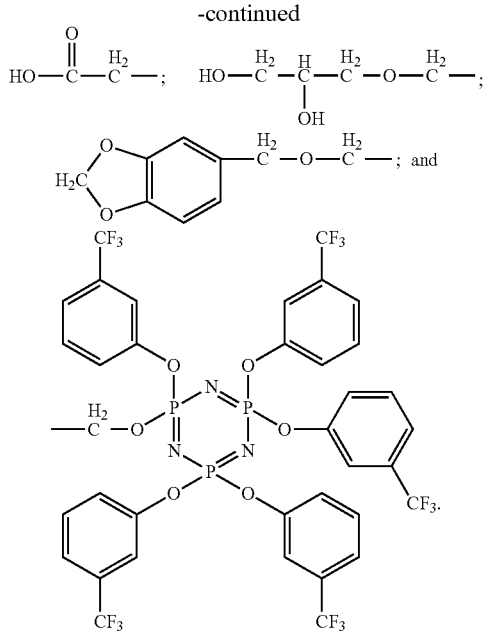

12. The method of claim 8, wherein Y is selected from the group consisting of

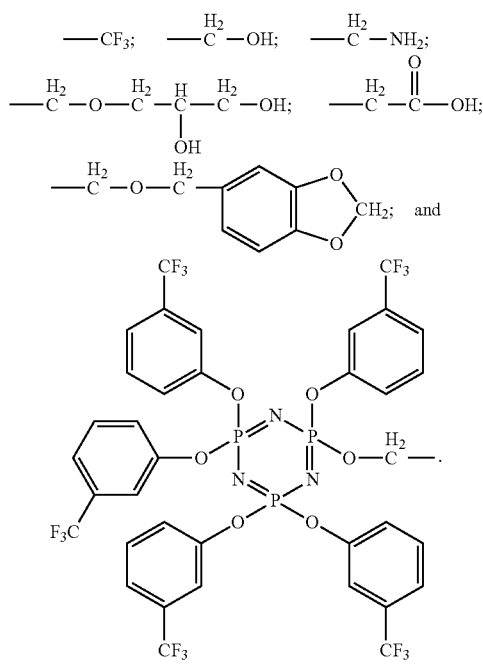

13. The method of claim 8, wherein the molecule has a molecular weight between approximately 2,000 g/mol and approximately 40,000 g/mol.

14. The method of claim 8, wherein the lubricant layer comprises a thickness between approximately 0.5 nm and approximately 2 nm.

15. The method of claim 14, wherein the lubricant layer comprises a thickness between approximately 1 nm and approximately 1.5 nm.

16. The method of claim 8, wherein the molecule has a take-off temperature of greater than approximately 400° C.

17. A magnetic recording medium comprising:
a substrate;
a magnetic recording layer; and
a lubricant layer, wherein the lubricant layer comprises a molecule having the formula:

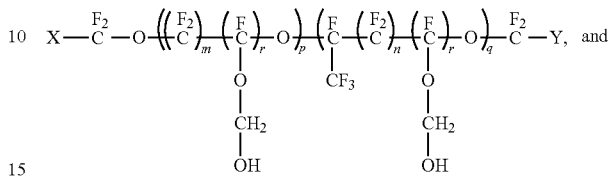

wherein $m \geq 3$; $n \geq 1$; $12 \leq p \leq 200$; $0 \leq q \leq 200$; X is selected from the group consisting of

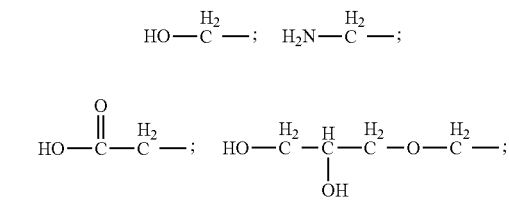

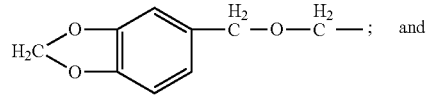

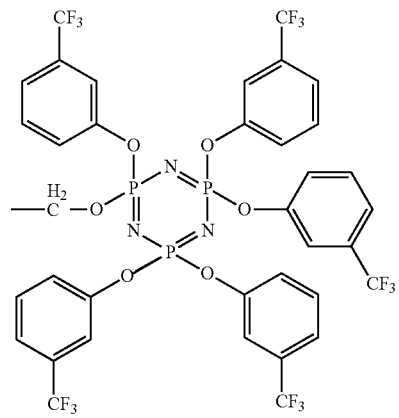

and Y is selected from the group consisting of

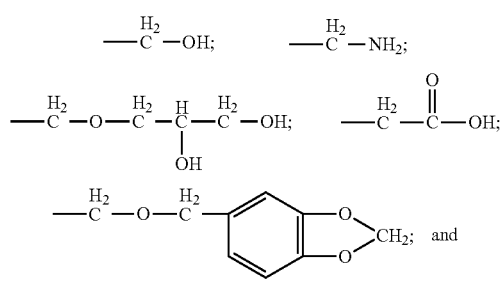

-continued

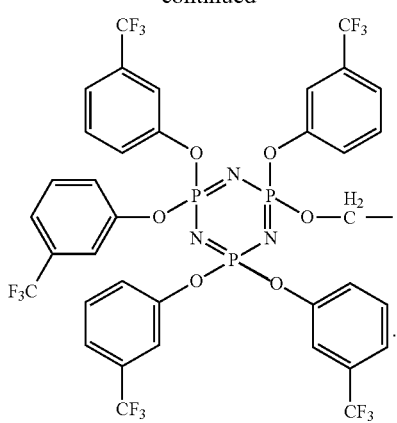

18. The magnetic recording medium of claim 17, wherein the molecule has a molecular weight between approximately 2,000 g/mol and approximately 40,000 g/mol.

19. The magnetic recording medium of claim 17, wherein the lubricant layer comprises a thickness between approximately 0.5 nm and approximately 2 nm.

20. The magnetic recording medium of claim 19, wherein the lubricant layer comprises a thickness between approximately 1 nm and approximately 1.5 nm.

21. The magnetic recording medium of claim 17, wherein the molecule has a take-off temperature of greater than approximately 400° C.

* * * * *